(12) United States Patent
Tannhof et al.

(10) Patent No.: US 7,352,918 B2
(45) Date of Patent: Apr. 1, 2008

(54) METHOD AND CIRCUITS FOR SCALING IMAGES USING NEURAL NETWORKS

(75) Inventors: Pascal Tannhof, Fontainebleau (FR); Ghislain Imbert De Tremiolles, Saint Paul (FR)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 10/321,166

(22) Filed: Dec. 17, 2002

(65) Prior Publication Data

US 2003/0133605 A1 Jul. 17, 2003

(30) Foreign Application Priority Data

Dec. 21, 2001 (EP) .................................. 01480146

(51) Int. Cl.
*G06K 9/32* (2006.01)
(52) U.S. Cl. .................. 382/298; 382/156; 382/300
(58) Field of Classification Search ................ 382/156, 382/298, 300
See application file for complete search history.

(56) References Cited

U.S. PATENT DOCUMENTS 4,631,751 A * 12/1986 Anderson et al. ........... 382/298

(Continued)

FOREIGN PATENT DOCUMENTS

| JP | 11017934 | 1/1999 |
|----|----------|--------|
| WO | WO 9616380 A1 | 5/1996 |

OTHER PUBLICATIONS

Madani et al.; "ZISC-036 Neuro-processor Based Image Processing", IWANN 2001, pp. 200-207, Jun. 13-15, 2001.*

(Continued)

*Primary Examiner*—Bhavesh M Mehta
*Assistant Examiner*—John B Strege
(74) *Attorney, Agent, or Firm*—William H. Steinberg, Esq.; Kevin P. Radigan, Esq.; Heslin Rothenberg Farley & Mesiti, P.C.

(57) ABSTRACT

An artificial neural network (ANN) based system that is adapted to process an input pattern to generate an output pattern related thereto having a different number of components than the input pattern. The system (26) is comprised of an ANN (27) and a memory (28), such as a DRAM memory, that are serially connected. The input pattern (23) is applied to a processor (22), where it can be processed or not (the most general case), before it is applied to the ANN and stored therein as a prototype (if learned). A category is associated with each stored prototype. The processor computes the coefficients that allow the determination of the estimated values of the output pattern, these coefficients are the components of a so-called intermediate pattern (24). Assuming the ANN has already learned a number of input patterns, when a new input pattern is presented to the ANN in the recognition phase, the category of the closest prototype is output therefrom and is used as a pointer to the memory. In turn, the memory outputs the corresponding intermediate pattern. The input pattern and the intermediate pattern are applied to the processor to construct the output pattern (25) using the coefficients. Typically, the input pattern is a block of pixels in the field of scaling images.

6 Claims, 11 Drawing Sheets

U.S. PATENT DOCUMENTS

| | | | | |
|---|---|---|---|---|
| 4,712,140 A | * | 12/1987 | Mintzer et al. | 382/298 |
| 4,872,064 A | * | 10/1989 | Tutt et al. | 382/298 |
| 5,008,752 A | * | 4/1991 | Van Nostrand | 348/581 |
| 5,327,257 A | | 7/1994 | Hrytzak et al. | |
| 5,347,597 A | * | 9/1994 | Stephenson | 382/300 |
| 5,710,869 A | * | 1/1998 | Godefroy et al. | 706/41 |
| 6,233,365 B1 | * | 5/2001 | Teruhiko | 382/298 |
| 6,915,026 B2 | * | 7/2005 | Sasai | 382/298 |
| 2003/0035594 A1 | * | 2/2003 | Kondo et al. | 382/298 |

OTHER PUBLICATIONS

David et al.; "Description and practical uses of IBM ZISC036", Proceedings of SPIE, vol. 3728, pp. 198-211, Mar. 1999.*

Zero Instruction Set Computer Manual—Pattern Recognition Made Easy, Silicon Recognition Inc., Oct. 2000.*

David R et al., "Noise Reduction and Image Enhancement Using a Hardware Implementation of Artificial Neural Networks", SPIE vol. 3728, pp. 212-221: ISSN 0277-786X.

Taguchi A. et al., "Enlargement of Digital Images by Using Multi-Neutral Networks", Part of the IS&T/SPIE Conference on Nonlinear Image Processing x, San Jose, CA; Jan. 1999, SPIE vol. 3646, pp. 112-119.

Tamaki O et al. "Enlargement of Digital Images by Neural Networks", Bulletin of Faculty of Engineering, University of the Ryukyus University. Ryukyus Japan, No. 59; Mar. 2000, pp. 7-15. *T5 English Translation-Abstract Only.

* cited by examiner

FIG. 5 recognition phase

FIG. 10 learning phase

FIG. 11 recognition phase

FIG. 12

METHOD AND CIRCUITS FOR SCALING IMAGES USING NEURAL NETWORKS

FIELD OF THE INVENTION

The present invention relates to data processing and more particularly to a method and circuits for scaling images using neural networks.

BACKGROUND OF THE INVENTION

In the particular field of image processing, recovering missing pixels or scaling an image (generally towards a greater size or format) are extensively performed operations. To determine the pixel value at a missing location, a classic method consists of taking a small area of the data that is determined by a sampling window and providing it to an interpolator. The interpolator uses a polynomial equation with fixed degree and coefficients, which in turn determine the filter coefficients. This standard method has some inconveniences. Identification of an adequate polynomial equation is not easy. The coefficients are generally fixed once for all, and thus are clearly not optimized for all the data or encountered if recalculated for each set of data, consumes a large amount processing time. The number of coefficients is limited (generally to less than 20), making the interpolation very approximate in most cases. For example, if black and white type images are processed, the interpolation may create gray levels that do not exist in the original image. A great number of arithmetic operations have to be performed that generally imply a number of serial computations, making the interpolation very slow. Finally, the time for completing the interpolation depends on the number of coefficients and is thus variable for each set of data.

The present invention solves the above problem by using an artificial neural network (ANN) instead of arithmetic interpolators and extrapolators. In today's data processing, a good many recognition, prediction, and computation tasks are performed using reference databases to characterize input data. Depending upon the problem to be solved, these reference databases contain patterns that are sub-images, sub-signals, subsets of data, and combination thereof. The patterns that are stored in these reference databases are referred to herein below as prototypes. As known to those skilled in the art, they are generally represented by a vector, i.e. an array in a space of a given dimension. Well-known methods for characterizing new (unknown) patterns, referred to herein below as input patterns, using reference databases are based upon input space mapping algorithms such as the K-Nearest-Neighbor (KNN) or the Region Of Influence (ROI). The underlying principle of these algorithms is to compute the distance (Dist) between the input pattern and each of the stored prototypes in order to find the closest one(s) depending upon predetermined thresholds or not. U.S. Pat. No. 5,717,832 assigned to IBM Corp describes neural semiconductor chips and artificial neural networks (ANNs) of a new type. These ANNs, referred to hereinbelow as ZISC ANNs, are based on such input space mapping algorithms mentioned above and include innovative elementary processors, referred to hereinbelow as the ZISC neurons (ZISC is a registered trademark of IBM Corp). ZISC neurons are described in U.S. Pat. No. 5,621,863 assigned to IBM Corp U.S. Pat. Nos. 5,717,832 and 5,621,863 are both incorporated herein by reference. An essential characteristic of the ZISC neurons lies in their ability to work in parallel, i.e. when an input pattern is presented to the ZISC ANN, all the neurons compute the distance between the input pattern and each of the prototypes stored therein at the same time.

Figure 1:
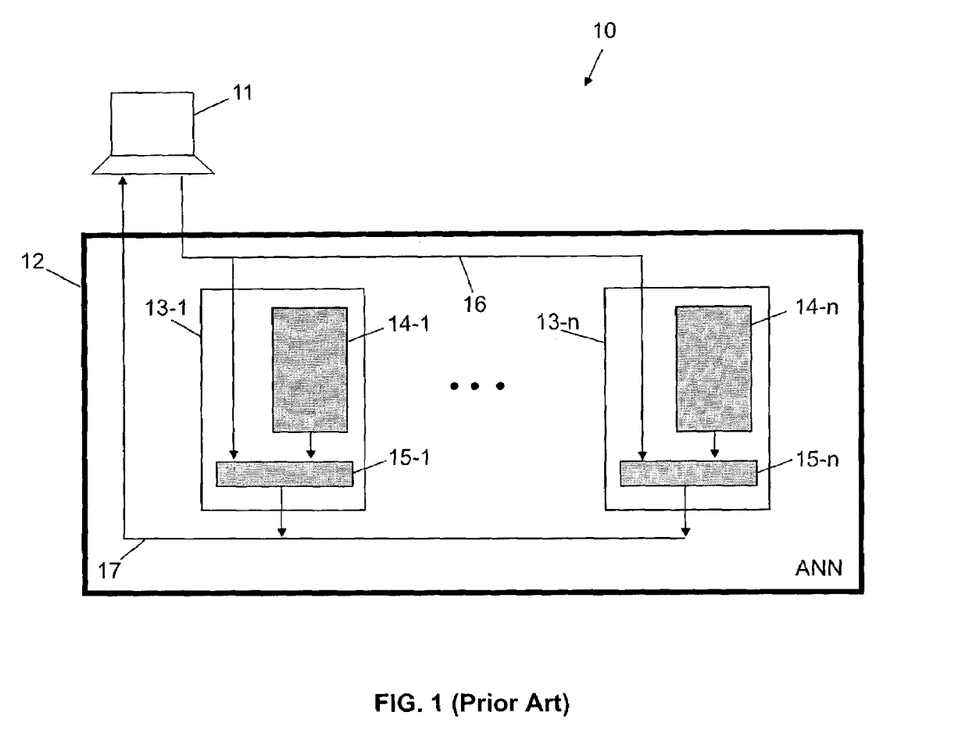
FIG. 1 schematically shows the architecture of a neural classifier consisting of a conventional ANN using ZISC neurons under the control of a host computer wherein each neuron computes the distance between the input pattern presented to the ANN and the prototype stored therein as is known.

FIG. 1 is the basic hardware that will be used to illustrate the main principle of the distance evaluation technique as it is currently practiced in a ZISC ANN. Turning now to FIG. 1, there is shown the architecture of a neural system 10 comprising a host computer 11, e.g. a personal computer (PC), and a conventional ZISC ANN referenced 12 including a plurality of neurons 13-1 to 13-n (generically referenced as 13 hereinafter). Physically, the ANN 12 can include a printed circuit board having a few ZISC chips, e.g. ZISC036 chips which include 36 neurons each, mounted thereon. Each neuron, e.g. 13-1, is schematically reduced to two essential elements for the sake of simplicity: a prototype memory 14-1 dedicated to store a prototype when the neuron has learned an input pattern during the learning phase and a distance evaluator 15-1. Data-in bus 16 sequentially applies the set of components of an input pattern to all neurons 13 of the ANN 12 in parallel and data-out bus 17 transmits the results of the distance evaluation process, typically the distance and the category to the host computer 11. As taught in the above mentioned U.S. Pat. No. 5,621,863, when an input pattern is fed into a neuron 13 through data bus 16, it is compared in the distance evaluator 15 with the prototype to evaluate the distance therebetween. The ZISC ANN 12 is configured to have all the neurons working in parallel, so that the result generally includes a pair of values: the minimum distance that characterizes the closest input pattern and the category associated thereto. For the sake of simplicity, the category register is not shown in FIG. 1, it is considered to be included in the distance evaluator 15. As apparent in FIG. 1, the ZISC ANN architecture is such that all the distance evaluations are simultaneously performed in all the neurons composing the ANN.

SUMMARY OF THE INVENTION

According to one aspect of the present invention there is described an artificial neural network based system adapted to process an input pattern to generate an output pattern related thereto but having a different number of components which comprises:

means for generating input patterns;

an artificial neural network composed of neurons capable of storing input patterns as prototypes with a category associated therewith in the learning phase;

memory means configured for storing an intermediate pattern for each stored prototype wherein the components of said intermediate pattern are the coefficients allowing determination of the estimated values of the output pattern, and outputting this intermediate pattern upon receipt of the corresponding category, which is used as a pointer; and processor means adapted for receiving said input and intermediate patterns and for processing said input and intermediate patterns in order to produce said output pattern in the recognition phase.

The system may further comprise:

storage means connected to said artificial neural network and said memory to save/restore said input and intermediate patterns, respectively.

In another aspect, the present invention also provides a method of learning an input pattern and an output pattern related thereto having the same or a different number of components which comprises the steps of:

a) providing an input pattern and an output pattern;

b) applying said input and output patterns to a dedicated processor that computes the coefficients that will subsequently allow determination of the estimated values of a similar output pattern in the recognition phase, these coefficients are the components of a so-called intermediate pattern;

c) storing the input pattern in an artificial neural network composed of neurons capable of storing said input pattern or data related thereto as a prototype with a category associated thereto; and d) storing said intermediate pattern in a memory at a location that can be addressed by said category playing the role of a pointer.

The present invention further provides a method of processing an input pattern to generate an output pattern related thereto having the same or a different number of components which comprises the steps of:

a) providing a neural system comprising an artificial neural network composed of neurons capable of storing said input pattern or data related thereto as a prototype with a category associated thereto and a memory configured for storing coefficients that will subsequently allow determination of the estimated values of a similar output pattern in the recognition phase, these coefficients are the components of a so-called intermediate pattern;

b) providing an input pattern for recognition;

c) applying said input pattern to a dedicated processor that transmits it with or without processing to said artificial neural network to extract the category of the closest prototype stored therein, which in turn acts as a pointer to output said intermediate pattern from the memory; and d) applying said input and intermediate patterns to said processor to generate the output pattern using said coefficients.

It is therefore an object of the present invention to provide a method and circuits for scaling images using an artificial neural network (ANN) that fully take advantage of the benefit of the parallel data processing capabilities thereof.

It is another object of the present invention to provide a method and circuits for scaling images using an artificial neural network (ANN) that offers high flexibility and accuracy in the determination of the pixel values of the scaled image because the number of prototypes in the ANN is not limited.

It is yet another object of the present invention to provide a method and circuits for scaling images using an artificial neural network (ANN) which offers a short and constant response time irrespective of the number of neurons composing the ANN.

It is still another object of the present invention to provide a method and circuits for scaling images using an artificial neural network that allows saving of the scaled image related data in a database.

It is another object of the present invention to provide a method and circuits for scaling images using an artificial neural network that allows loading of scaled image related data from the most adequate database for optimized adaptation to any type of image.

It is another object of the present invention to provide a method and circuits for scaling images using an artificial neural network that allows an automatic selection of the database best adapted to the input pattern.

It is another object of the present invention to provide a method and circuits for scaling images using an artificial neural network that allows an automatic learning (self-learning) of the scaling to be performed that is adapted to each image.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DESCRIPTION OF A PREFERRED EMBODIMENT

Like reference numerals (with and without primes) are used throughout the several drawings to designate identical (corresponding) parts.

Figure 2:
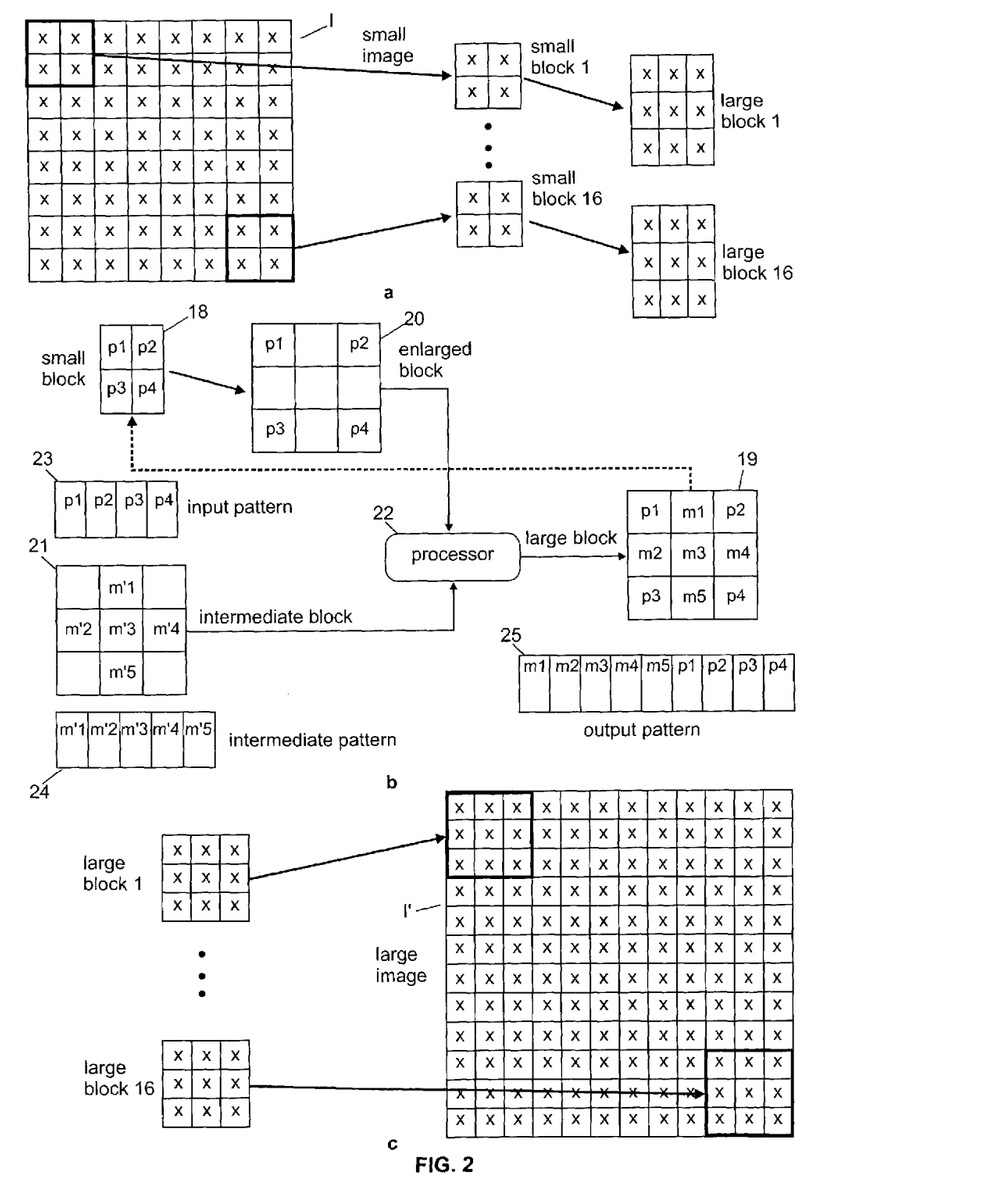
FIG. 2, comprised of FIGS. 2a, 2b, and 2c, illustrates the basics of the scaling-up technique.

FIG. 2, which is comprised of FIGS. 2a, 2b, and 2c, illustrates the fundamentals of the image scaling technique to introduce the present invention.

FIG. 2a illustrates a common way of scanning an image. An image I, referred to hereinbelow as the small image, which consists of a block of 8×8 pixels, is scanned in sequence by a sliding analysis window to extract the 16 adjacent elementary 2×2 pixel blocks, referred to hereinbelow as the small blocks, labeled 1 to 16, that compose it. Note that other types of sampling can be performed by the sliding analysis window (e.g. with an overlapping between two consecutive sampling). For instance, a common problem is to increase the size (or format) of the 8×8 pixel small image I to a 12×12 pixel large image without loosing its substance. To that end, still referring to FIG. 2a, as it will be explained later on, this operation will be required to transform each 2×2 pixel small block to a 3×3 pixel large block. This scaling operation, towards a greater image (referred to as the scaling-up or up-conversion in the technical literature), finds many applications, for instance, in the fields of the television, home cinema, and the like.

Now turning to FIG. 2b, a small block (or template) 18 of 2×2 pixels (or values related to the pixels thereof) must be transformed into a block 19 of 3×3 pixels which has the desired large block size or format. The value of pixels labeled p1 to p4 in block 18 is determined. The four known pixels in block 18 are placed at the four corners of a block 20, referred to as the enlarged block (note that other configurations of blocks 18, 19, and 20 are possible). As apparent in FIG. 2b, the five pixels that are missing are shown in block 19 where they are labeled m1 to m5. The value of these missing pixels has to be estimated by experimentation or by computation. In the latter case, classical interpolation can be used, for instance, m1 could be the average value of pixels p1 and p2, i.e. m1=(p1+p2)/2 and so on. It is the role of a dedicated processor (not shown) to determine the function that links said estimated values and known values, and to derive the coefficients to be applied to known pixels to estimate the values of the missing pixels. These coefficients labeled m'1 to m'5 fill block, 21 referred to as the intermediate block. The coefficients m'1 to m'5 are determined once and for all. In normal operation, as soon as a small block 18 is presented, the processor 22 in FIG. 2b, combines blocks 20 and 21 to obtain the completed large block 19. It is the role of processor 22 to determine the value of estimated pixels m1 to m5 (derived from coefficients applied to the known pixels) in block 19. As is apparent in FIG. 2b, the enlarged block 20 and the intermediate block 21 thus have the same format as the large block 19. The reverse operation, i.e. to produce a small block from a large block, e.g. the transformation of 3×3 pixel large block 19 in the 2×2 pixel small block 18 can also be envisioned as shown by the dashed line.

Finally, large blocks 22 are the bricks that can be used to build a large image. Now turning to FIG. 2c, large blocks labeled 1 to 16 are used to construct large image I', which represents the up-conversion of small image I.

It is to be noted that the coefficients m'1 to m'5 placed in intermediate block 21, are the polynomial equation coefficients mentioned above. In the example described by reference to FIG. 2, this would mean that these coefficients would be applied to all small blocks 1 to 16 without change, during the up-conversion of small image I in large image I'.

In essence, the present invention significantly departs from the prior art teachings, on a major point, the use of a ZISC ANN and an associated memory that will allow, in the case of the example described by reference to FIG. 2b, to have up to 16 different intermediate blocks 21, one for each small block 1 to 16. In the following description, still referring to FIG. 2b, in order to be consistent with the vocabulary commonly used in the field of neural systems, the four known pixels p1 to p4 form the input pattern 23, the coefficients m'1 to m'5 form the intermediate pattern 24 and finally, the estimated pixels m1 to m5 and the known pixels form the output pattern 25. These values are the components of their respective patterns. In this case, the input pattern has four components and the output pattern has nine components clearly demonstrating the desired change in size or format as a result of the data processing described by reference to FIG. 2b.

Figure 3:
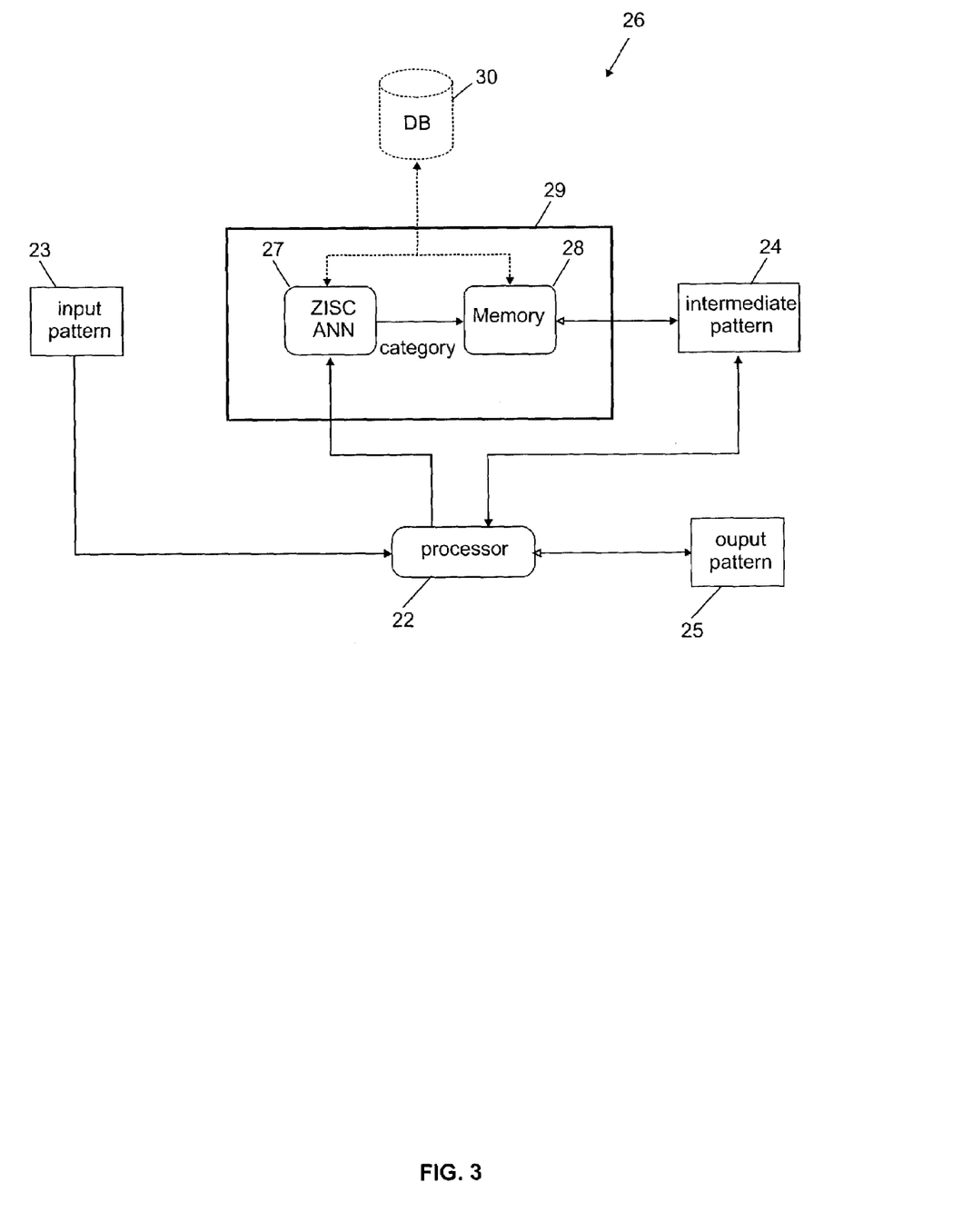
FIG. 3 schematically shows the artificial neural network based system in accordance with the present invention.

FIG. 3 shows the innovative neural system 26 according to the present invention that is adapted to process an input pattern to generate an output pattern having a different size or format, i.e. having a different number of components. A typical application of neural system 26 is, for instance, to perform the scaling-up of a small image into a large image.

Now turning to FIG. 3, the core of the system 26 includes in a ZISC ANN 27 and a memory 28, such as a RAM memory, that are serially connected to compose the pattern converter 29. The input pattern 23 is applied to processor 22, where it can be processed or not (the most general case), before it is applied to the ZISC ANN 27. Processor 22 can either apply the intermediate pattern 24 to the memory 28, or receive said intermediate pattern therefrom. Processor 22 has a bi-directional link to receive/output the output pattern 25. Let us assume that, for the sake of simplicity, the ZISC ANN 27 has already learned a number of input patterns, stored as prototypes in the neurons thereof, and a category is associated with each stored prototype as standard. Let us further assume that for each category there is a corresponding set of coefficients (the intermediate pattern), such as defined by the user through experiments or calculated by a computer, that are already stored in memory 28. Now, these assumptions being made, let us consider that an input pattern 23 is presented to the ZISC ANN 27 in the recognition phase. The category of the closest prototype is output from the ZISC ANN and is used as a pointer to memory 28. In turn, memory 28 outputs the intermediate pattern 24 which corresponds to that category. As apparent in FIG. 3, the input pattern 23 and this intermediate pattern 24 are applied to processor 22 that constructs output pattern 25. The input pattern can be a block of pixels in the field of image processing but could find its origin anywhere else. When an original image, such as small image I shown in FIG. 2a, needs to be up-converted in pattern converter 29, it should be understood that the process described above must be repeated for all the 2×2 pixel small blocks thereof as so many input patterns.

Finally, the content of the prototype memories in the ZISC ANN 27 (in each neuron, a RAM memory stores the prototype components) and the content of memory 28 can be saved in a nonvolatile memory 30 to create a database. Conversely, this database can be used to load the prototype components (and associated categories) in the ZISC ANN 27 and the corresponding intermediate patterns in memory 28 whenever desired. For instance, let us assume that pattern converter 29 will be used for scaling-up human faces, the data stored in database 30 are all the data that have been previously learned in memory 28 for this purpose.

Let us come back to the filling of the memory 28 by the user or the computer and give a few examples for the sake of illustration. For instance, let us consider an electrical signal, the amplitude of which varies as a function of time and a sliding analysis window that samples the signal. Let us assume that the components of an input pattern are formed by p consecutive amplitude values obtained by the sampling of the signal which define a curve. The coefficients describing this curve will be stored in the memory 28 as intermediate patterns and will be used later on, in conjunction with input patterns, to estimate the missing amplitude values for another curve of the same type. The more data of this type stored in the memory, the better the estimated values to construct an original signal. The same principle applies in the field of image processing, for still or moving images. But, in this case, the stored data now represents either two-dimension pixel related data (still images) or three-dimension pixel related data (moving images).

Figure 4:
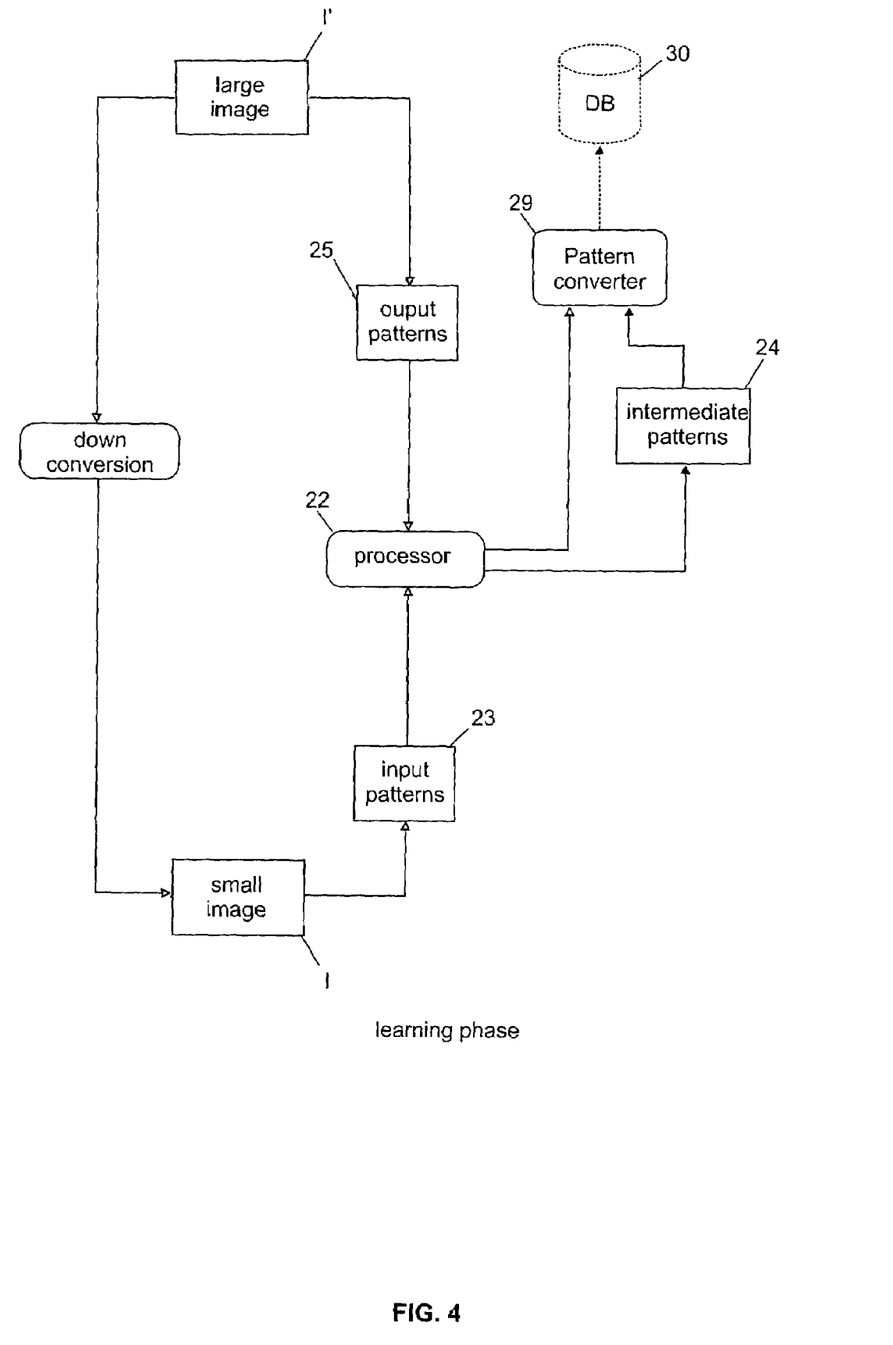
FIG. 4 is a block diagram illustrating the learning operation when the hardware of FIG. 3 is used.

FIG. 4 illustrates the operation of neural system 26 during the learning phase in the particular case of image down-conversion. The large image I' is down-converted to produce a small image I having a reduced number of pixels (8×8 instead of 12×12 if we refer to FIG. 2). Then, small image I is scanned to produce small blocks as explained above. The corresponding input patterns 23 are applied to processor 22.

On the other hand, the output patterns 25 which result from the scanning of the large image I' are also applied in sequence to processor 22. Processor 22 first determines the coefficients to fill the intermediate patterns, then it sends both the input patterns and the corresponding intermediate patterns to the pattern converter 29. As a final result, input patterns are stored as prototypes in the neurons of the ZISC ANN and the coefficients in corresponding locations of memory of pattern converter 29. Optionally, the content of both neuron memories of the ZISC ANN 27 and the memory 28 can be saved in nonvolatile memory 30. A similar reasoning applies in the case of image up-conversion.

Figure 5:
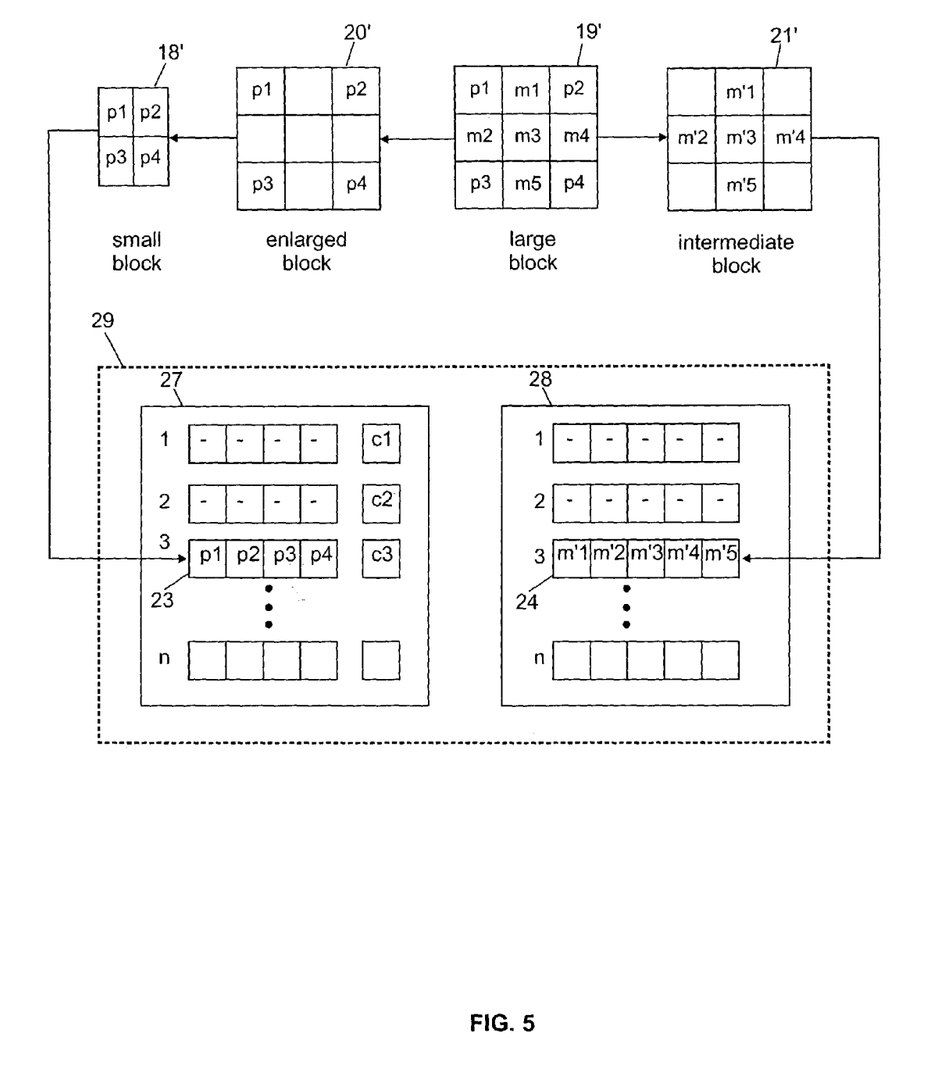
FIG. 5 is a block diagram illustrating the learning operation of FIG. 4 when applied to the example of FIG. 2.

FIG. 5 illustrates the above learning operation when applied to the example described by reference to FIG. 2b. Now turning to FIG. 5, large block 19' to be learned by the pattern converter 29, is first transformed in the enlarged block 20', for instance, by decimation, as known to those skilled in the art. The four known pixels p1 to p4 are then extracted from the decimated block 20' to form small block 18', and stored in the prototype memory of the first free neuron of the ZISC ANN 27 (in this case, the third one) as the components of a prototype. This set of components form the input pattern 23 mentioned above. A category, in this case labeled c3, is assigned to this prototype as standard. On the other hand, the large block 19' is transformed the same way in the intermediate block 21'. The five coefficients m'1 to m'5 are determined as explained above, and stored in a location of memory 28 that has a known correspondence with the prototype storing the input pattern 23, in this case, in the third memory location as shown in FIG. 5. These five coefficients form the intermediate pattern 24 mentioned above.

Figure 6:
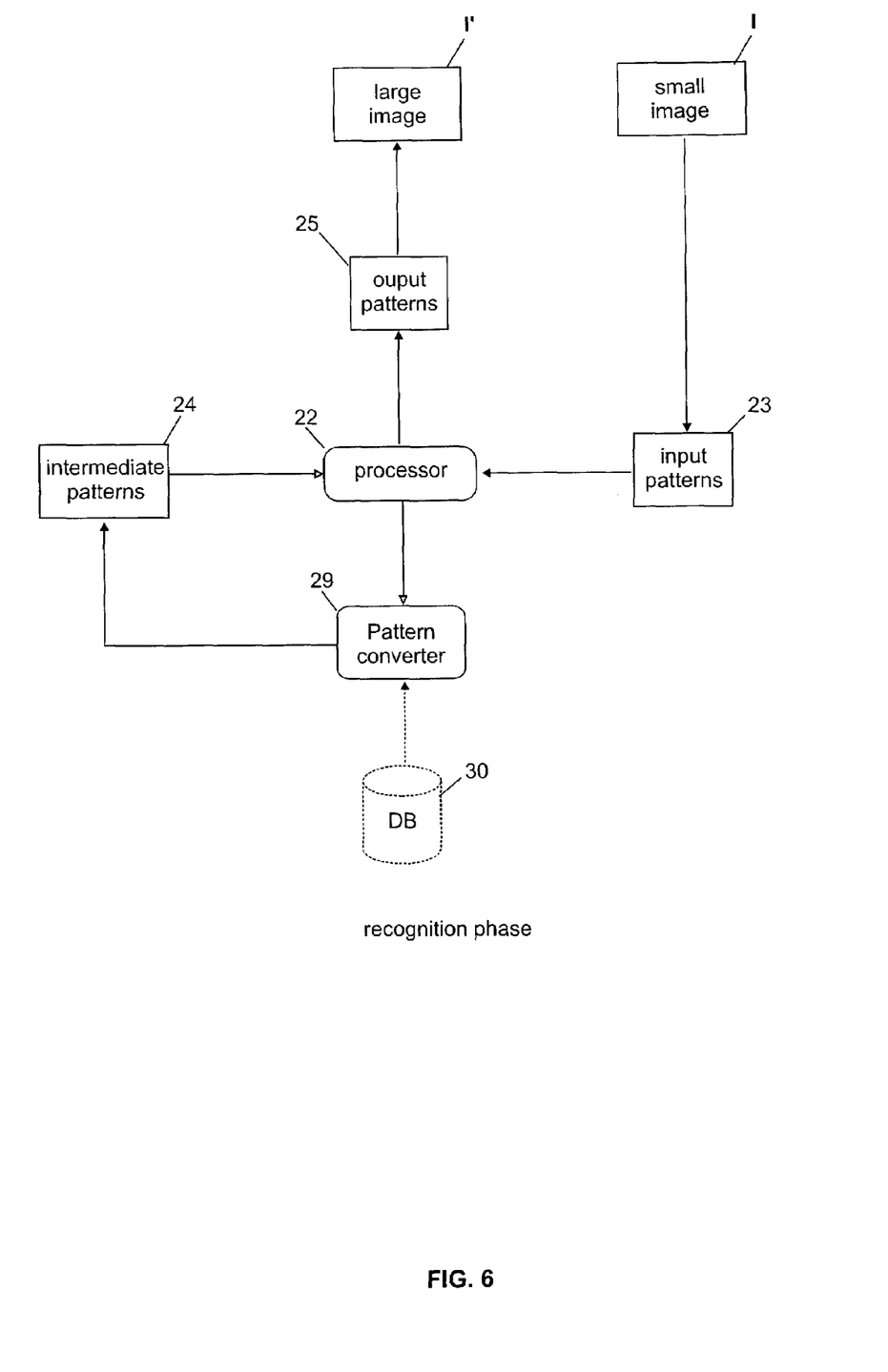
FIG. 6 is a block diagram illustrating the recognition operation when the hardware of FIG. 3 is used.

FIG. 6 illustrates the operation of neural system 26 during the recognition phase when input patterns are presented to the ZISC ANN for classification. Now turning to FIG. 6, input patterns 23 resulting from the scanning of small image I, block per block, as explained above, are presented in sequence to processor 22 where they are modified or not (the general case), then applied to the pattern converter 29. In turn, pattern converter 29 generates the corresponding intermediate patterns 24 that are applied to the processor 22. In processor 22, input pattern 23 (modified or not) and intermediate patterns 24 are processed to produce output patterns 25. The large image I' can be now constructed as illustrated above by reference to FIG. 2c. Note that, as a preliminary step, the database stored in nonvolatile memory 30 can be loaded in the ZISC ANN 27 and in memory 28 at each change of application. For instance, the database related to landscapes can be loaded in the pattern converter 29 to replace data concerning human faces.

Figure 7:
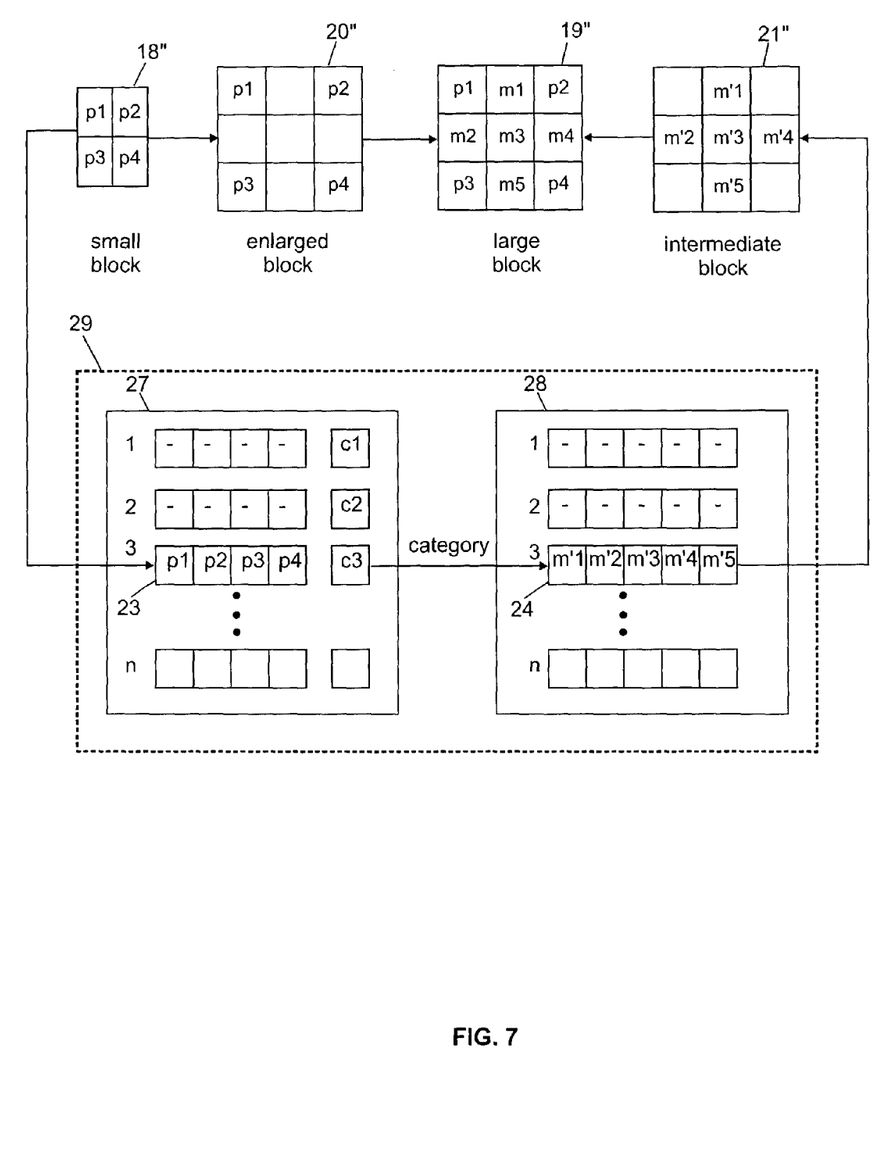
FIG. 7 is a block diagram illustrating the recognition operation of FIG. 6 when applied to the example of FIG. 2.

FIG. 7 illustrates the above recognition operation when applied to the example described by reference to FIG. 2a. Now turning to FIG. 7, a small block 18", formed by the four known pixels p1 to P4 is recognized by the third neuron of ZISC ANN 27. In turn, ZISC ANN 27 outputs its category, i.e. C3, which is applied as a pointer to memory 28, in this case, to the third position thereof. The coefficients m'1 to m'5 stored at this location, are then output to create intermediate block 21". On the other hand, small block 18" is also used as a template to create enlarged block 20". Finally, data in blocks 20" and 21" are processed to construct large block 19".

Figure 8:
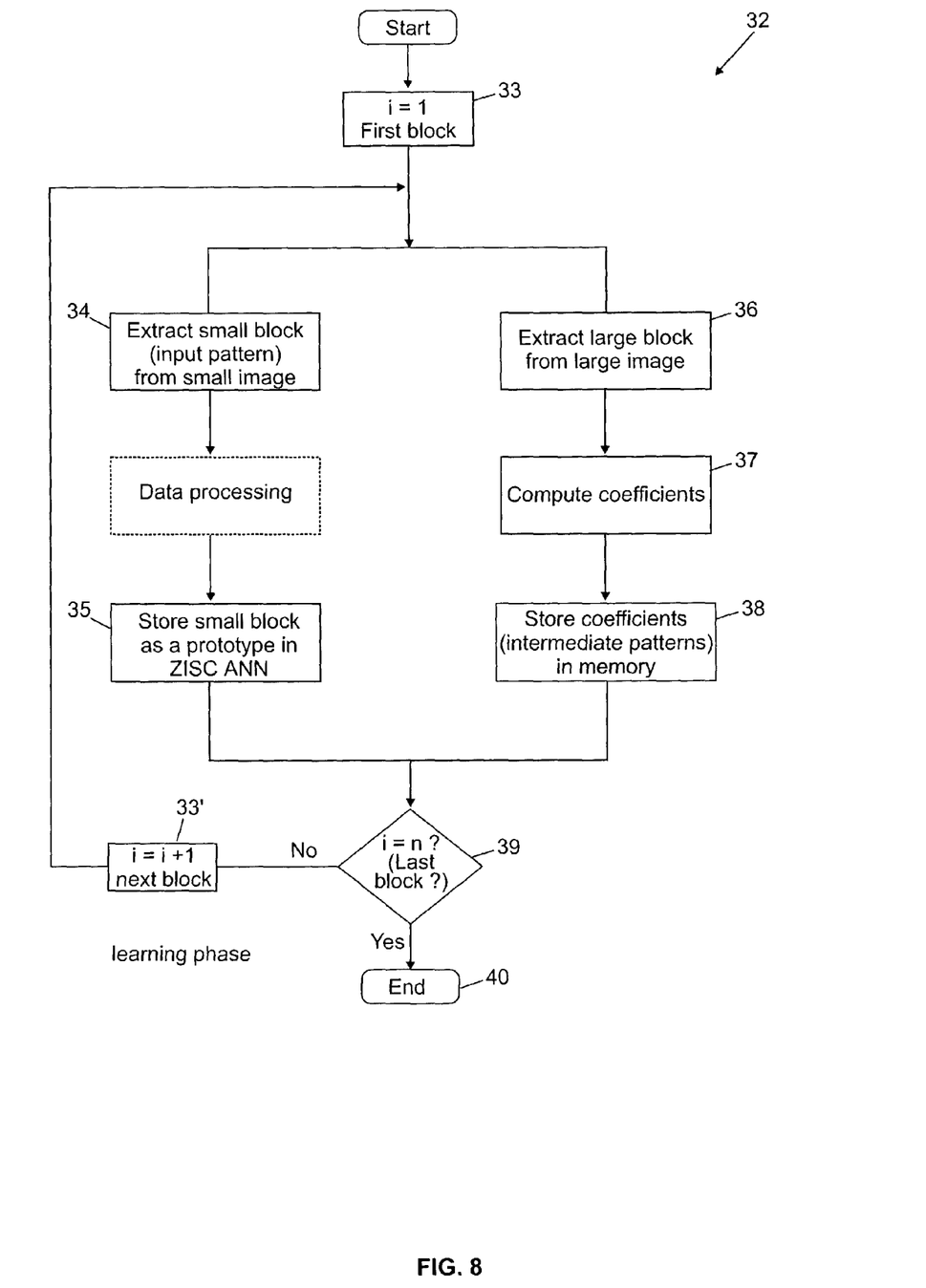
FIG. 8 is a flow chart showing the sequence of essential steps of the learning algorithm.
Figure 9:
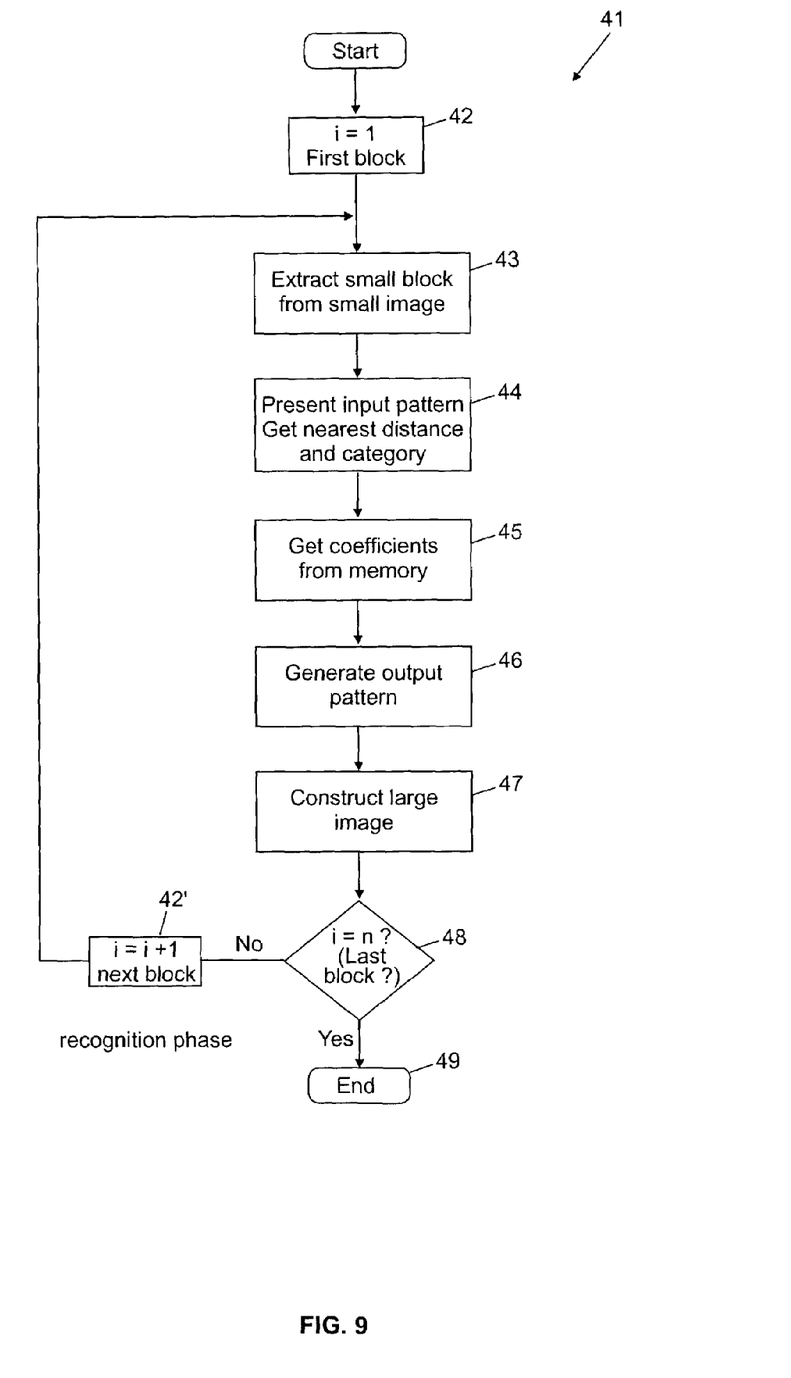
FIG. 9 is a flow chart showing the sequence of essential steps of the recognition algorithm.

FIG. 8 illustrates the algorithm 32 employed in the method of the present invention in the learning phase when the neural system 26 shown in FIG. 3 is used, still referring to the specific application to image processing described by reference to FIG. 2, for the sake of simplicity. An index i describing any (small or large) block of the (small or large) image to be processed is initialized to 1 (box 33). As apparent in FIG. 2, in this particular case, index i varies from 1 to 16 corresponding to the 16 blocks constituting either image I or I'. First, the large image I' is transformed into a small image I by standard down-conversion (not shown). The pixel values, i.e. p1 to p4, are extracted from the small block having the current index i (box 34) to form an input pattern 23, then stored as a prototype in the first free neuron of ZISC ANN (box 35). Note that, between steps 34 and 35, an optional step can be performed in processor 22 to process the block data before storage. On the other hand, a large block is extracted from the large image I' (box 36) and the coefficients of the missing pixels, forming an intermediate pattern 24, i.e. m'1 to m'5, are computed (box 37) and stored in memory 28 (box 38). At this stage of the learning phase, the pattern converter 29 is loaded. A test is then performed to determine whether both small and large images I and I' have been fully processed, i.e. if the last block index has been reached (box 39). If yes, the learning of up-conversion data is terminated (box 40), else the steps 34 to 39 are repeated. The neural system 26 is now ready to construct a large image I' from a small image I FIG. 9 illustrates the algorithm 41 employed in the method of the present invention in the recognition phase when the neural system 26 shown in FIG. 3 is used, still referring to the application to image processing described by reference to FIG. 2, for the sake of simplicity. Now turning to FIG. 9, an index i describing the small block rank of the small image I to be processed is initialized to 1 (box 42). The small block having the current indicia i is extracted from the small image (box 43). The corresponding input pattern is presented to the ZISC ANN 27 to get the closest distance and the category associated thereto (box 44). Now, the content of the memory 28 at the location pointed to by this category is read, so that the coefficients are available to form the intermediate pattern (box 45). The output pattern can now be generated since it is obtained by combining the input and output patterns (box 46). This output pattern is used to construct the large image I' (box 47). A test is then performed to determine whether the small image I has been fully processed, i.e. if the last block index has been reached (box 48). If yes, the recognition of the small image I is terminated (box 49), else the steps 43 to 48 are repeated.

Figure 10:
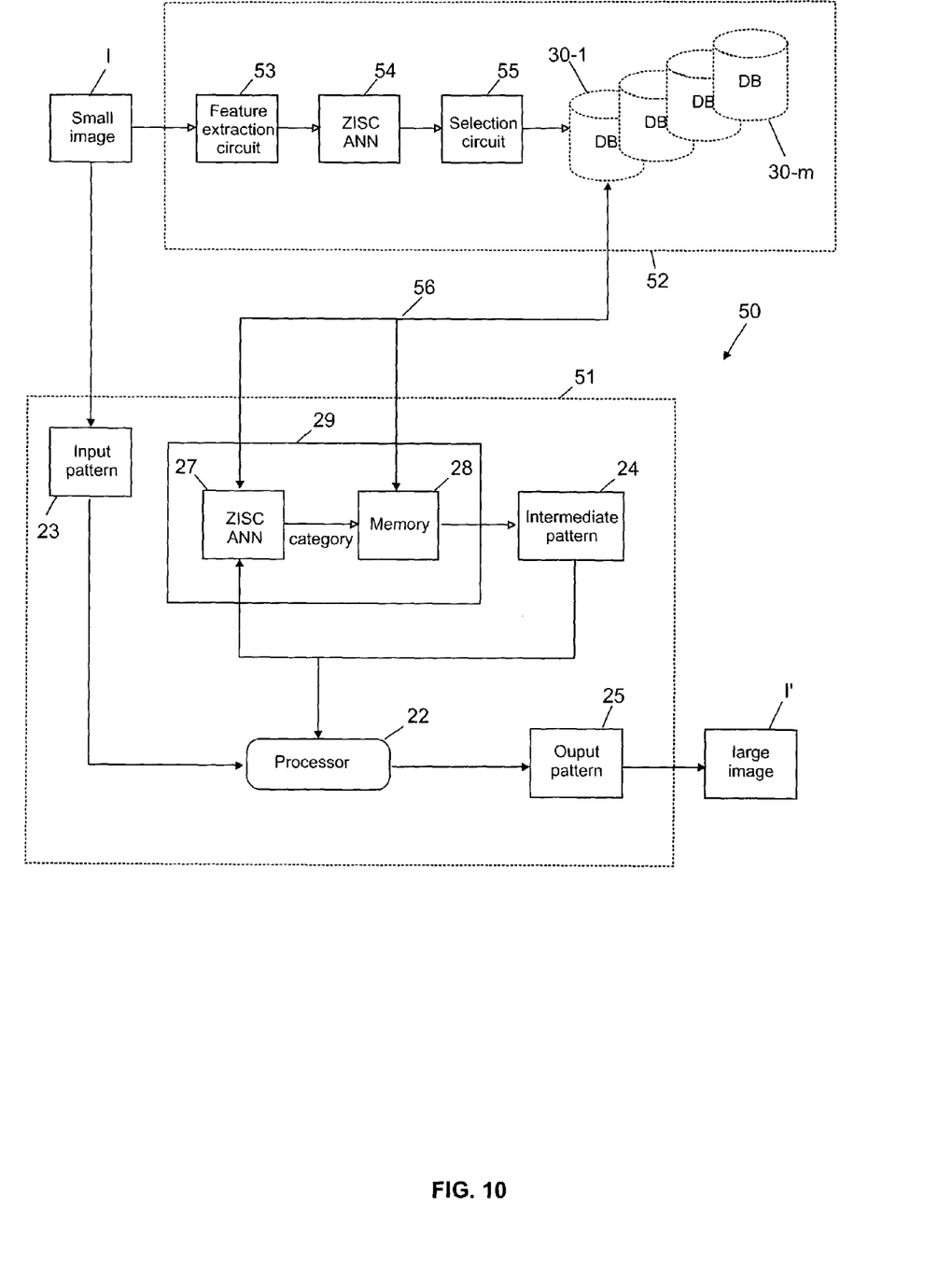
FIG. 10 is a block diagram showing the hardware that allows an automatic selection of the database best adapted to the input pattern.

FIG. 10 illustrates an improvement of the neural system 26 that allows an automatic selection of the most suitable database 30, wherein each database is adapted to process a specific set of small images. Turning to FIG. 10, the hardware implementation 50 is comprised of blocks 51 and 52. Block 51 is identical to neural system 26 shown in FIG. 3. Block 52 comprises a feature extraction circuit 53, a ZISC ANN 54, a database selection circuit 55 and a plurality of nonvolatile memories 30-1, . . . , 30-m. Block 52 is made up of standard circuits, the association of a feature extraction circuit and an ANN is usually referred to as a classifier in the technical literature. The operation of this implementation is as follows. A small image I is applied to the feature extraction circuit 53 that generates the input patterns to be processed by the ZISC ANN 54. For each recognized input pattern, the ZISC ANN will output a category that will select the best database among said plurality of databases via circuit 55. On the other hand, this small image I is also applied to block 51 which operates as described above by reference to FIG. 6. The hardware implementation 50 shown in FIG. 10 allows the loading of the content of the most suitable database in the pattern converter 29 via bus 56.

Figure 11:
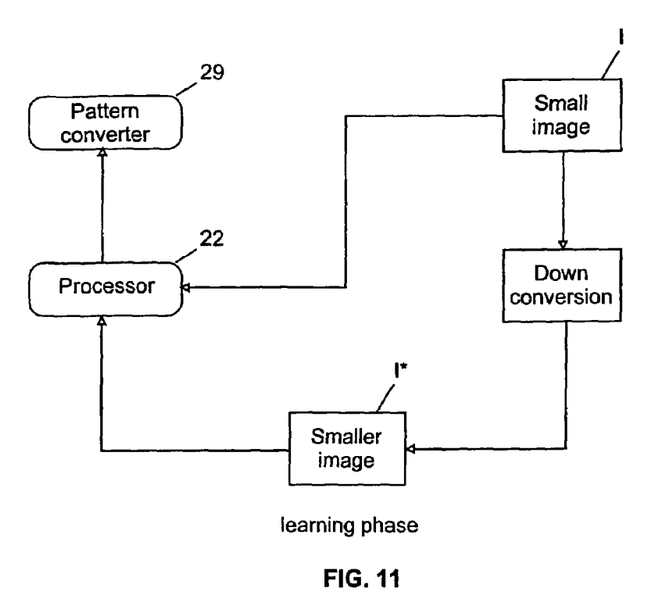
FIG. 11 is a block diagram showing the hardware that allows an automatic learning (self-learning) of the scaling to be performed that is adapted to each image.

FIG. 11 illustrates the case where the learning phase uses the image to be up-converted. In FIG. 6, the small image is only used for up-conversion to construct a large image in the recognition phase. Now, a small image is used not only for the recognition phase, but also in the learning phase, so that the up-conversion process now includes a self-learning step. Now turning to FIG. 11, the small image I is down-converted into a smaller image I*. The input patterns derived from the blocks forming said smaller image are presented to the pattern converter 29 (via processor 22), then stored as prototypes in the ZISC ANN part thereof. On the other hand, the output patterns derived from the small image I, are applied to processor 22 to compute the coefficients that form the intermediate pattern. In turn, the intermediate patterns are applied to pattern converter 29 and stored in the memory part thereof. This type of learning provides outstanding accuracy in the subsequent recognition of small images that have been learned. In essence, the methods described by reference to FIGS. 11 and 4 are the same, it just suffices to exchange images I and I' on the one hand and images I* and I on the other hand.

Figure 12:
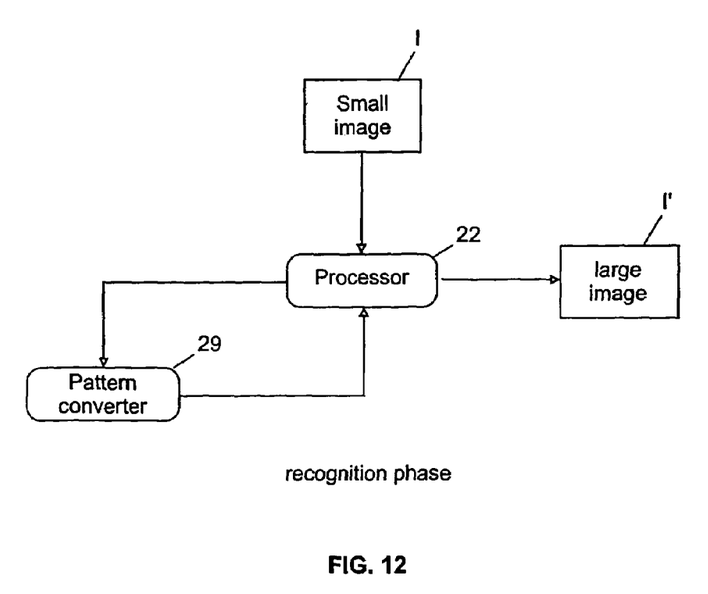
FIG. 12 is a block diagram showing the hardware used for the recognition of a self-learned image.

As apparent in FIG. 12, in this case, there is no change in the recognition phase of a small image with regard to the description given above by reference to FIG. 6.

It will be apparent to those skilled in the art that various modifications may be made in the process and products illustratively described therein, without departing from the spirit or scope of the invention as expressed in the following claims.

What is claimed is:

1. A method for learning a small block pattern and a large block pattern related thereto having a different number of components than the small block pattern, the method comprising:
   a) providing a small block pattern and a large block pattern related thereto;
   b) applying said small block and large block patterns to a dedicated processor for computing coefficients of a transform function that will subsequently allow determination of estimated values for a selected small block pattern in a recognition phase, these coefficients being components of an intermediate pattern;
   c) storing the small block pattern in an artificial neural network composed of neurons capable of storing the small block pattern or data related thereto as a prototype with a category associated with each prototype;
   d) storing said intermediate pattern in a memory at a location that can be addressed by said category, said category acting as a pointer to said intermediate pattern; and
   e) wherein upon receipt of the selected small block pattern, a closest prototype stored by the artificial neural network is identified and the associated category is extracted to act as a pointer to the stored intermediate pattern, wherein an up-converted image is generated by applying the retrieved intermediate pattern to the received, selected small block pattern.

2. The method of claim 1 further comprising:
   e) storing the small block and intermediate patterns in a nonvolatile memory to establish a database that can be subsequently used to restore them.

3. A method for processing a small block pattern to generate a large block pattern related thereto having a different number of components than the small block pattern, the method comprising:
   a) providing a neural system comprising an artificial neural network including neurons capable of storing said small block pattern or data related thereto as a prototype with a category associated therewith and a memory configured to store coefficients that will subsequently allow determination of the estimated values of the large block pattern in a recognition phase, these coefficients being the components of an intermediate pattern;
   b) providing a selected small block pattern for recognition derived from an input image;
   c) applying said selected small block pattern to a dedicated processor that transmits said input selected small block pattern with or without processing to said artificial neural network to extract the category of the closest prototype stored therein, which in turn acts as a pointer to output a closest intermediate pattern from the memory; and
   d) applying said input selected small block pattern and said closest intermediate pattern to said processor for facilitating generating of an up-converted image of the input image using said coefficients of the closet intermediate pattern.

4. A method for learning an input image consisting of n large blocks of m pixels and a down-converted image consisting of n small blocks of p pixels (p<m), the method comprising:
   a) initializing a block indicia i,;
   b) deriving a large block pattern from a large block i having m components of the input image;
   c) down-converting the large block i of m pixels into a small block i of p pixels, to produce a small block pattern having p components;
   d) applying said small block and large block patterns to a dedicated processor for computing the coefficients of a transform function describing conversion between the small block and large block patterns, the coefficients subsequently facilitating up-converting of a selected small block pattern in a recognition phase, these coefficients being the components of an intermediate pattern;
   e) storing the small block pattern in an artificial neural network composed of neurons capable of storing said small block pattern or data related thereto as a prototype with a category associated with the prototype;
   f) storing said intermediate pattern in a memory at a location that can be addressed by said category as a pointer;
   g) incrementing large block indicia i;
   h) repeating said steps b) to g) until all large blocks of the input image have been processed; and
   i) wherein upon receipt of a selected small block pattern of the input image, a closest prototype stored by the artificial neural network is identified and the associated category is extracted to act as a pointer to the stored intermediate pattern, wherein generating of an up-converted image is facilitated by applying the retrieved intermediate pattern to the selected small block pattern.

5. A method for processing an input image including n blocks of p pixels to generate an up-converted image including n large blocks of m pixels (p<m), the method comprising:
   a) providing a neural system comprising an artificial neural network composed of neurons capable of storing a plurality of small block patterns or data related thereto as a prototype with a category associated with the prototype, the plurality of small block patterns being generated from a down-converted image derived from the input image, and a memory configured to store coefficients subsequently allowing up-converting of a selected small block pattern of the input image in a recognition phase, these coefficients being the components of an intermediate pattern, each intermediate pattern being associated with a corresponding small block pattern;

b) initializing a block indicia i;

c) deriving a selected small block pattern from block i having p components of the input image;

d) applying said selected small block pattern to a dedicated processor that transmits said small block pattern with or without processing to said artificial neural network for extracting the category of the closest prototype stored therein, which in turn acts as a pointer to output said associated intermediate pattern from the memory;

e) applying said selected small block pattern and the intermediate pattern associated with the closest prototype to said processor for facilitating generating of an up-converted image using said coefficients of the intermediate pattern;

f) incrementing block indicia i; and g) repeating steps b) to f) until all blocks of the input image have been processed.

6. A method for scaling an input image consisting of n blocks of p pixels including both a learning operation and a recognition operation, said learning operation comprising:

a) initializing a block indicia i;

b) deriving a large block pattern from block i having p pixels;

c) down-converting said block i of p pixels into a smaller block of q pixels (q<p), to produce a small block pattern having q components;

d) applying said small block and large block patterns to a dedicated processor for computing a set of coefficients allowing the determination of estimated up-converted values of a selected small block pattern during the recognition operation, these coefficients being the components of an intermediate pattern;

e) storing the small block pattern in an artificial neural network composed of neurons capable of storing said small block pattern as a prototype with a category associated thereto;

f) storing said intermediate pattern in a memory at a location that can be addressed by said category as a pointer;

g) incrementing block indicia i; and h) repeating steps b to g) until all large blocks of the input image have been processed;

and said recognition operation comprising:

i) initializing a small block indicia j;

j) deriving a selected small block pattern from small block j having p pixels of the input image;

k) applying said selected small block pattern of the input image to the dedicated processor that transmits said selected small block pattern with or without processing to said artificial neural network for extracting the category of the closest prototype stored therein, which in turn acts as a pointer for outputting said intermediate pattern from the memory;

l) applying said selected small block pattern and said intermediate pattern retrieved from memory to said processor for facilitating generating of an up-converted image from the input image;

m) incrementing small block indicia j; and n) repeating steps j) to m) until all small blocks of the input image have been processed.

* * * * *